United States Patent [19]

Toole et al.

[11] Patent Number: 4,783,822

[45] Date of Patent: Nov. 8, 1988

[54] MULTI-ADJUSTABLE HEADBAND

[75] Inventors: Pierce C. Toole, Cocoa; Howard E. Chalson; Walter S. Bussey, both of Merritt Island, all of Fla.

[73] Assignee: The United States of America as represented by the Administrator of the National Aeronautics and Space Administration, Washington, D.C.

[21] Appl. No.: 894,541

[22] Filed: Aug. 8, 1986

[51] Int. Cl.$^4$ .................. H03M 1/05; A44B 21/00
[52] U.S. Cl. .................................. 381/187; 2/201;
24/68 B; 381/183
[58] Field of Search ........... 179/156 R, 156 A, 182 R, 179/182 A; 2/208, 209; D14/36; 379/430; 381/183, 187; 24/68 B

[56] References Cited

U.S. PATENT DOCUMENTS

| 231,599 | 8/1880 | McDermott | 379/430 |
|---|---|---|---|
| 360,985 | 4/1887 | Basch | 2/209 |
| 381,559 | 4/1888 | Kleinert et al. | 2/209 |
| 503,703 | 8/1893 | Kleinert | 2/209 |
| 817,457 | 4/1906 | Turner | 381/187 |
| 947,153 | 1/1910 | Forth | 351/245 |
| 1,167,368 | 1/1916 | Adams-Randall | 381/183 |
| 1,546,567 | 7/1925 | Childress | 381/183 |
| 1,552,593 | 9/1925 | Childress | 381/183 |
| 1,577,910 | 3/1926 | Koch et al. | 381/183 |
| 2,883,672 | 4/1959 | Hornickel et al. | 2/209 |
| 3,148,376 | 9/1964 | Aileo | 381/183 |
| 3,225,147 | 12/1965 | Dollinger | 379/449 |
| 3,325,824 | 6/1967 | Donegan | 24/68 B |
| 3,447,160 | 6/1969 | Teder | 2/209 |
| 3,884,240 | 5/1975 | Gilman | 2/209 |
| 4,259,747 | 4/1981 | Taesler et al. | 381/169 |
| 4,409,442 | 10/1983 | Kamimura | 381/187 |
| 4,455,457 | 6/1984 | Akira | 2/209 |
| 4,471,496 | 9/1984 | Gardner, Jr. et al. | 2/423 |

FOREIGN PATENT DOCUMENTS 3207098  11/1982  Fed. Rep. of Germany .

Primary Examiner—Jin F. Ng
Assistant Examiner—Danita R. Byrd
Attorney, Agent, or Firm—James O. Harrell; John R. Manning

[57] ABSTRACT

A headband for a headset has separate coarse and fine adjustment features. The adjustments may be to the axial distance between at least one earpiece element and a side support. Such adjustment to the axial distance varies the pressure exerted on the head of the user. The present fine adjustment feature may be used while the headset is being worn, thereby permitting a user to optimize the amount of pressure between the contending criteria of comfort and keeping the headset in place on the user's head.

5 Claims, 4 Drawing Sheets

MULTI-ADJUSTABLE HEADBAND

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention concerns in general a headband having at least two different adjustment features. In particular, a first adjustment feature enables a user to make coarse adjustments of the axial distance between selected portions of the headband, while a second adjustment feature permits the user to make fine adjustments of such axial distance.

The use of headbands to support electrical or mechanical equipment (such as earphones, microphones or flashlights) has long been known for advantageously permitting "hands-off" operation of such electrical and mechanical equipment. In general, conventional headbands such as those which support an earphone element for either one or both ears of the user usually constitute a "C-clamp" type device comprising a spring, the tension of which applies pressure to the head of the user so as to hold a headset on the user's head. This spring tension is usually somewhat adjustable by flexing the elements which comprise the headband.

A general problem of such prior art is that a user experiences difficulty in precisely adjusting the amount of tension of the headband gripping his head. Often a user is painfully aware of such limitations of a conventional headset in that the pressure exerted on his head by the headset is too great or too little to be satisfactory. The pain of excessive pressure may be compounded by the necessity of wearing the headband for lengthy periods of time. If the pressure is too great, discomfort, lack of concentration and even headaches may be caused. The seriousness of such disadvantages is directly related to the type of activity in which the user is engaged. For example, if a user is an airplane pilot, air traffic controller, or even an astronaut, loss of concentration can have serious and perhaps deadly consequences.

However, if a user attempts to loosen the headset to relieve such excessive pressure, and only a coarse adjustment is present, the user is likely to decrease the pressure to the point where slippage of the headset can occur. It is possible for such slippage to cause loss of communications if the earphone element becomes separated from the user's ear. Such an occurrence can have adverse consequences equal to the loss of concentration, etc. consequences stated above.

It is possible that some of the foregoing problems with over-pressure and under-pressure fittings could be partially reduced by custom fitting of every headset for each individual user, but such a solution is highly impractical, if not literally impossible, and very costly in the aggregate, as understood without further explanation.

Accordingly, there has been a long felt need for headsets which can be mass manufactured, but yet easily adjusted to fit an individual user, taking into account both the physical dimensions and personal tastes of those wearing such headsets.

Some attempts at solving this problem are known. For example, the U.S. Pat. No. (1,546,567) to Childress discloses a head support for radio receivers. The head support includes a flexible headband which rests across the head of a user, and which is associated with a basically rectangular metal framework mounted thereabove. In the center of such framework is a turn-buckle which through alternate rotation causes the metal framework to expand and contract in such a manner that pivot points formed at each end of the headband cause the radio receiver elements of the Childress device to rock back and forth, thereby providing some measure of adjustment with respect to a user's head. As stated specifically in lines 96-108 of page 1 of Childress, the angle of rest of the receivers on a user's ears is rocked back and forth by turning of the turn-buckle. However, there is no change in the headband pressure on the user's head because the headband 5 of Childress does not change once it conforms to a user's head. Also, there is no change in the basic axial distance between the two radio receivers of the Childress head support device.

German Patent No. 3207098 to Gorike discloses adjustable earphone speaker elements, which adjust by virtue of their retractability into a headset. There is no suggestion that such adjustment enables minimization of pressure from a headband, or selected fine variation of the axial distance between end elements of the headband. The U.S. Pat. No. 4,409,442 to Kamimura is similar to the German Gorike reference in that there is no disclosure of any headband adjustments, only selected positioning of retractable ear piece members. Likewise, the U.S. Pat. No. 4,455,457 to Akira is similar to the Kamimura reference, but additionally provides a locking feature for the retractable elements by using a lobe element and a recess.

U.S. Pat. No. 3,225,147 to Dollinger discloses a coarse set screw adjustment for a headband which holds a conventional telephone handset against the ear and mouth of a user. The coarse set screw adjustment also permits folding of the headband. There is no suggestion of any two-way adjustment, particular including both coarse and fine adjustments for headband pressure or axial distance between certain headband elements. Likewise, the U.S. Pat. Nos. (3,884,240) to Gillman and (947,153) to Forth which generally disclose set screw mechanisms and rack and pinion mechanisms fail to suggest particular features of the present invention which are discussed in greater detail hereinbelow.

SUMMARY OF THE INVENTION

This invention discloses in general a headset having a headband comprised of flexible members which are adjustable by a user so as to make coarse adjustments in the pressure exerted on the user's head by earphone elements supported by the headband. Longitudinal members of the headset across the top of a user's head further permit fine adjustment of the pressure exerted by such earphone elements on the user's head. The changes in such pressure are generally accomplished by changing the axial distance between earphone elements supported by the headband. Embodiments of this invention which have only one earphone element have a side support element formed on an opposite axial end of the headband. For such embodiments, the changes in pressure are reflected by changes in the axial distance between the side support element and the earphone element.

In more precise terms, the present invention concerns an adjustable headset having a headband with a side support and an earphone element on respective ends thereof, the headband being adapted to be flexed for coarse adjustment of the axial distance between the side support and the earphone element, and further including fine adjustment means associated with the headband for enabling fine adjustment of the axial distance between the side support and the earphone element.

One embodiment of the invention concerns an earphone element which is slidably mounted on one end of the headband. Such slidable mounting in conjunction with a triple-curved embodiment of a headband en provides coarse adjustment for such embodiment.

It is an object of this invention to provide a headband which is capable of both adequately supporting and clamping at least one earphone element to the head of a user, while also minimizing the pressure of same so as to maximize the comfort of the user.

It is another more general object of the present invention to provide a headset having both coarse and fine adjustment of pressure (or axial distance) related to elements thereof in contact with a user's head.

It is yet another object of the present invention to provide a headset which may be adjusted for coarse span of the headset prior to the user putting on the headset, and readily adjusted for fine adjustment of the headset span after the headset is on the head of the user.

It is a further feature and object of the present invention to both selectively control and selectively fix the relative position of elements of the headset which directly relate to the pressure and axial distance discussed above.

It is yet another object of the present invention to provide a headset which may be mass manufactured, but yet readily adapted for maximum comfort of individual users with respect to their varying physical characteristics and varying preferences.

The foregoing objects and summary of the present invention are intended as introductory statements only, and a complete description of the present invention is included in the remaining portions of the specification.

BRIEF DESCRIPTION OF THE DRAWINGS

A complete and fully enabling description of the present invention is set forth in the following discussion, with reference to the appended figures, in which.

Figure 1:
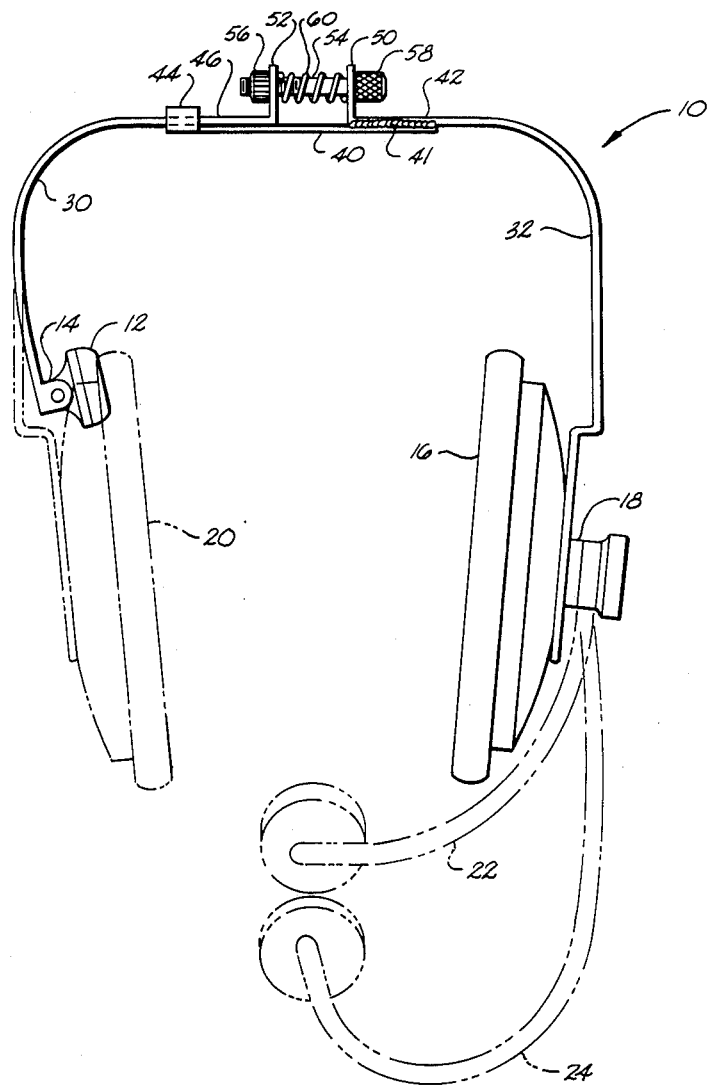
FIG. 1 is a perspective view of a headband in accordance with the present invention, and further illustrating one side support and one earphone element associated therewith, with an optional second earphone element and boom microphones illustrated in phantom.

Repeat use of reference characters is intended to signify same or analogous elements of different embodiments. Also, the present figures are generally intended as illustrative only, and are not intended to particularly provide illustrations drawn to scale. Hence, specific dimensional relationships are intended only where specifically stated.

DETAILED DESCRIPTION OF THE PREFERRED EMBODIMENTS

FIG. 1 illustrates a perspective view of a headband 10 in accordance with the present invention. Headband 10 is outfitted with a side support 12 pivotally mounted at an end portion 14. Axially displaced from side support 12 on the other side of headband 10 is a conventional earphone element 16. Conventional earphone element 16 is usually associated with an electrical input signal for driving a speaker element of the earphone element. For simplicity, such electrical input which is well known is not illustrated in the present figures. Earphone element 16 is mounted on a pivot member 18 formed at another end of headband 10.

Shown in dotted line in FIG. 1 are alternative features which may optionally be included with the solid line embodiment of FIG. 1, in any desired combination therewith. For example, a second earphone element 20 may be included in place of side support 12. Likewise, a conventional microphone boom 22 or 24 may be optionally included in a combination headset. Again, for simplicity, the electrical connections normally associated with such a conventional microphone element (which do not form particular features of this invention) are not shown in the present drawings.

If a single earphone element is used with side support 12 for a given embodiment, the basic span between such two elements is inherently established by the individual members of headband 10. For example, curved members 30 and 32 of headband 10 may be comprised of conventional light metal and plastic (or rubber) materials which offer some degree of flexibility. Manual setting of a span by a user based on such flexibility constitutes a coarse adjustment of the given span between elements such as side support 12 and earphone element 16.

In general, the present invention provides in addition to such coarse span adjustment a fine adjustment means. For example, the central portion of headband 10 in FIG. 1 illustrates one embodiment of a fine adjustment means in accordance with this invention. In particular, a bridge element 40 is fixed by solder 41 or the like to a straight portion 42 of curved element 32. Bridge element 40 is slidably engaged via member 44 with straight end portion 46 of curved element 30 in an overlapping relationship. Bridge element 40 with its fixed engagement and slidable engagement cannot however make fine adjustments by itself in accordance with the present invention. The upturned portions 50 and 52 of straight elements 42 and 46, respectively, are engaged with a variable separation element comprising a threaded shaft 54 engaged with nut 56 and fixedly associated with manual control portion 58. As knob 58 is rotated, threaded shaft 54 rotates to move elements 50 and 52 further or closer together, depending upon the direction of rotation of threaded shaft 54. Optionally, nut 56 may be fixedly secured to upturned portion 52 to ensure such function in response to rotation of knob 58. Compression spring 60 presses against elements 50 and 52 to ensure that such elements are separated from each other by the maximum distance permitted in accordance with the setting of the threaded shaft 54 and nut 56. As a practical matter, shaft 54 need not be threaded along its full length because spring 60 has a finite physical compression.

The pressure exerted on the head of someone wearing headband 10 is exerted at least by side support 12 and earphone element 16. Such pressure is generally determined by the axial distance between such two respective elements. Hence, the basic span between such two elements is established initially by the coarse adjustment to headband 10 (discussed above with regard to the flexure of elements 30 and 32) and the fine adjustment to such distance (and hence such pressure) is made by turning knob 58, which in turn controllably separates upright elements 50 and 52. The longitudinal force exerted by spring 60 ensures maximum separation of elements 50 and 52 in accordance with the setting of knob 58.

The general range of the basic span and the fine adjustment thereto may be established in accordance with empirical data concerning typical users. For example, Table A below presents human engineering data with dimensions in inches based on the 95th percentile of the tested subjects. Biauricular breadth is defined as the distance between the outside of the earlobes of a person. Head breadth is the displacement between the temple regions. Bitrigon breadth is the displacement between the interior edges of the ear. Therefore, the difference between bitrogen breadth and biauricular breadth is twice the width of the user's ear.

TABLE A

| HUMAN ENGINEERING DATA | | | | |
|---|---|---|---|---|
| Characteristic | Male Ground Personnel | Male Aviators | Women | Average |
| Biauricular Breadth | — | 7.95 | 6.84 | 7.39 |
| Head Breadth | 6.40 | 6.50 | 6.11 | 6.34 |
| Bitrogen Breadth | 5.69 | 5.98 | 5.41 | 5.69 |

Figure 2:
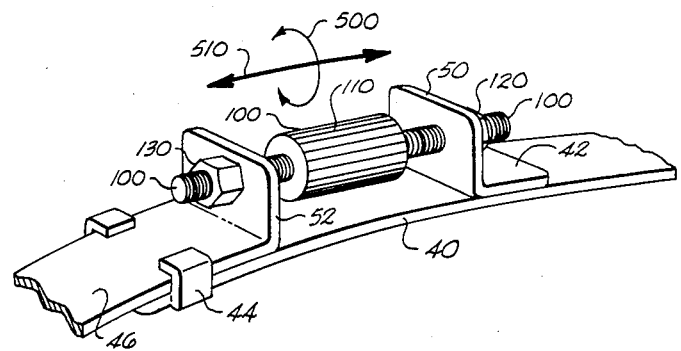
FIGS. 2-5 illustrate various modifications which may be made in accordance with the present invention to the fine adjustment means illustrated in the central portion of the headband of FIG. 1.

Referring now to FIG. 2, longitudinal members 42 and 46 (both shown only partially) are again illustrated in relationship with bridge element 40 and slidable engaging element 44. Threaded shaft 54 of FIG. 1 is replaced with a bidirectional left-hand pitch and right-hand pitch threaded tensioner element 100. Element 100 has a manually actuated portion 110 which causes the main shaft portion thereof to rotate in relation with nuts 120 and 130. Such a modification to the fine adjustment means of FIG. 1 permits deletion of compression spring 60. This deeetion is possible because shaft 100 is threaded along its entire length, except for that portion covered by manual actual portion 110.

As with nut 56 of FIG. 1, nuts 120 and 130 may be optionally fixed to their respective upright members 50 and 52 to greater ensure relative movement between them and bi-directional shaft 100 during its rotation. Also, upright portions 50 and 52 of FIG. 2 may be threaded so that rotation of manual actual portion 110 in either respective direction causes upright portions 50 and 52 to move respectively closer and further apart even without nuts 120 and 130, as is well understood by one of ordinary skill in the art when considering the foregoing description in conjunction with illustrations of FIG. 2.

Figure 3:
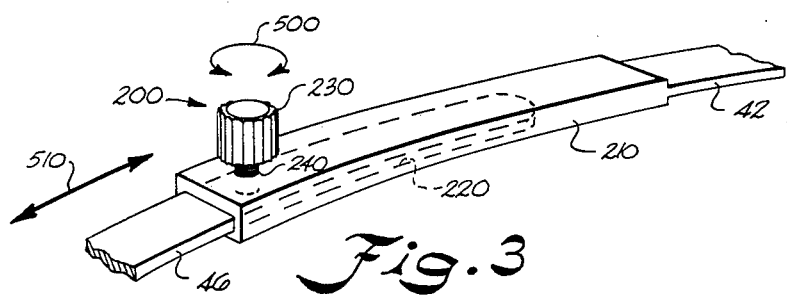

FIG. 3 shows yet another embodiment of the fine adjustment means of FIGS. 1 and 2. Straight elements 42 and 46 no longer have respective end upright portions, but instead are outfitted with a set screw clamp arrangement 200. Longitudinal member 42 has an enlarged portion 210 defining a channel 220, which slidably receives end element 46. A set screw 230 passes through an opening 240 in the enlarged portion 210 so as to engage end element 46. Opening 240 is threaded so as to threadably engage set screw 230, as is understood by one of ordinary skill in the art.

Set screw clamp arrangement 200 of FIG. 3 is particularly well suited for fine adjustment of headset span prior to a user placing a headset in accordance with the FIG. 3 embodiment on his or her head. Moreover, the opposing appendages of thumb and finger are well suited for grasping the set screw 230, and rotating same so as to make the desired fine adjustments. As is well understood by one of ordinary skill in the art, set screw 230 is rotated counter-clockwise to disengage longitudinal member 46. The longitudinal members 42 and 46 are then displaced relative each other at a desired position, and set screw 230 then re-engaged with member 46 by clockwise rotation of set screw 230.

Both the FIG. 1 and FIG. 2 embodiments are readily adjusted by a user while wearing such a headset. The FIG. 3 embodiment could, of course, be adjusted while it is being worn, but just not as readily as the other embodiments.

Figure 4:
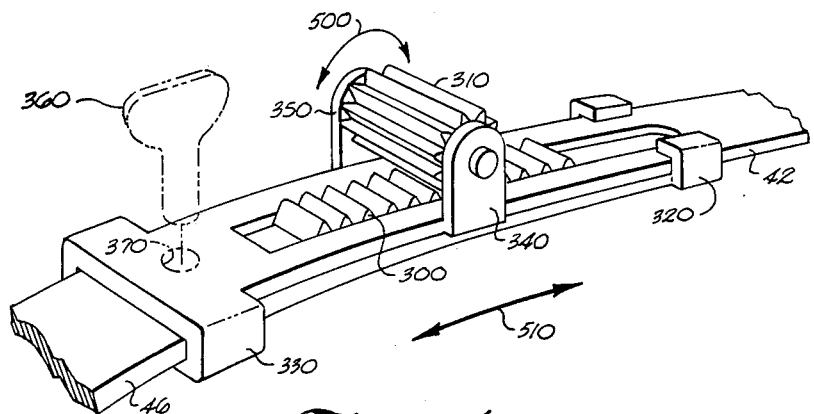

The embodiment of FIG. 4 includes a set screw feature as a optional feature to a rack and pinion arrangement which primarily functions as a fine adjustment means. Longitudinal members 46 and 42 are modified so as to have a rack 300 and pinion gear 310 respectively associated therewith. Rack 300 may typically be a nylon rack which is attached to member 46 with rivots, screws or cement. Slidable engagement is maintained between elements 42 and 46 by tracks 320 and 330. As is well understood, the axis of rotation of pinion gear 310 is maintained a predetermined distance from the teeth of rack 300 by spacers 340 and 350. Set screw 360 is optionally engagable with member 46 through an opening 370 in element 42 so as to fixedly secure their relative axial position. The circular motion of pinion gear 310 is translated by rack 300 to relative linear axial motion between longitudinal members 42 and 46. Hence, it is understood that the plane of engagement of the teeth of pinion gear 310 and the teeth of rack 300 is generally perpendicular to the plane defined by such relative axial movement of longitudinal members 42 and 46.

Figure 5:
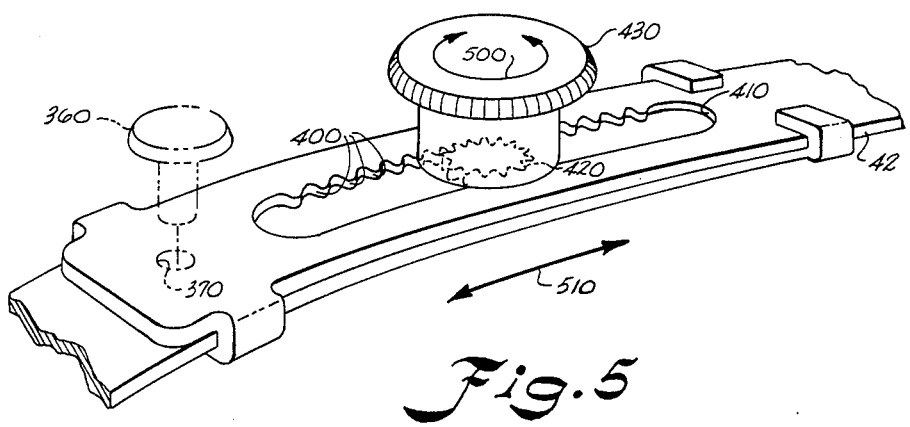

FIG. 5 illustrates one possible variation of the FIG. 4 embodiment, in which another rack and pinion arrangement is used whereby the teeth of the rack and the pinion are engaged primarily in the same plane occupied by the axially moving longitudinal members 42 and 46. The rack of FIG. 5 is defined by a plurality of teeth 400 which are formed in an opening 410 of element 42. The pinion gear of FIG. 5 shown in dotted line as gear 420 is driven by knob 430, as is well understood by one of ordinary skill in the art. Again, optional set screw 360 is associated with opening 370 so as to more securely fix the relative axial displacement of longitudinal members 42 and 46.

Whenever optional set screw 360 is loosened (if present at all), the embodiments of both FIG. 4 and FIG. 5 are readily adjustable while the headset unit is on a user. In general, the FIG. 4 embodiment may be operated by a single thumb or finger moving pinion gear 310. In contrast, the FIG. 5 embodiment is more readily operable by a two finger operation of the user, typically the opposing thumb and finger approach also used with the present FIG. 3 embodiment.

Throughout FIGS. 2-5, arrows 500 generally illustrate the direction of rotation or movement of the particular actuating elements of the respective fine adjustment means, while arrows 510 illustrate relative axial movement of longitudinal members 42 and 46 in response to the respective actuating elements.

While it is recognized that set screws and rack and pinion mechanisms are generally known in the art, the present invention in its broader terms concerns particular use of such elements in a particular fashion as disclosed with each headset embodiment so as to provide fine adjustment thereof. As is well understood from any one of the five presently disclosed embodiments, a user may make coarse adjustment of the axial distance between side support 12 and earphone element 16 by suitably flexing elements 30 and 32, while using one of the aforedescribed fine adjustment means for making fine variations in such distance, and hence coarse and fine adjustment of the pressure on the user's head as exerted by side support 12 and earphone element 16.

Figure 6:
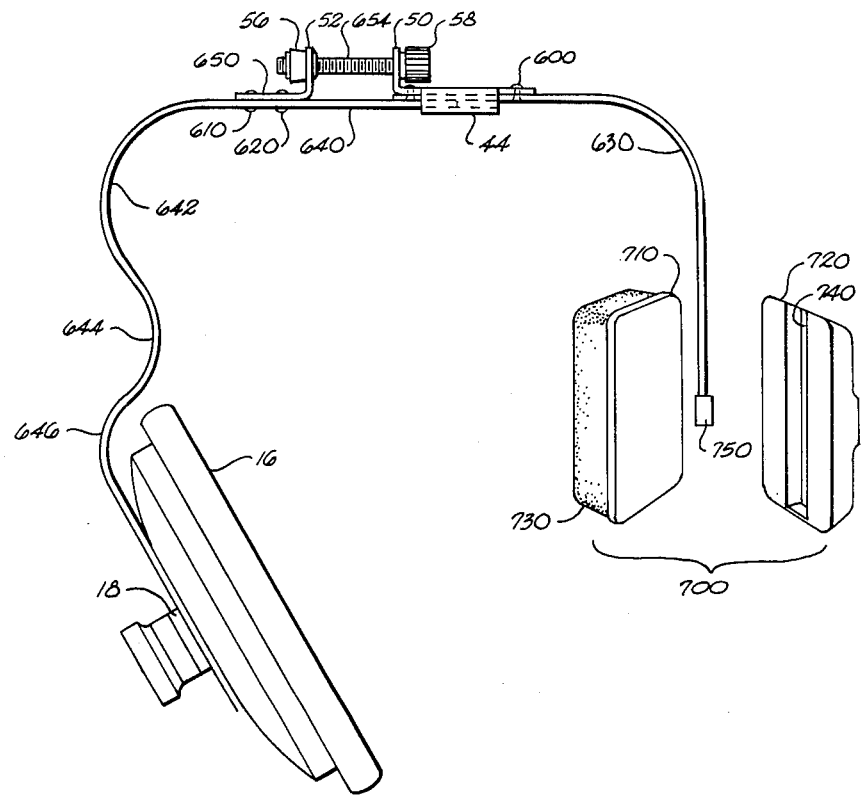
FIG. 6 illustrates another modification of this invention, including variation of the coarse adjustment thereof.

FIG. 6 illustrates fine adjustment features 44, 50, 52, 56 and 58, generally functioning the same as those illustrated in FIG. 1, but operating in the reverse sense thereto. Also, instead of weld material 41, rivets 600, 610 and 620 are utilized to variously secure the different members together. For example, rivets 610 and 620 secure headband member 640 to short member 650. Only a single rivet 600 is required on the opposite side because of screw element 654 because slide bracket 44 is widened in this embodiment compared to FIG. 1.

A triple-curve feature (curves 642, 644 and 646) of headband element 640 provide an extra degree of pre-load for earphone element 16 in the inward direction. In other words, element 16 is flexed inward (as illustrated by FIG. 6) until the headset is worn. Element 16 is mounted in pivot element 18, as in previous emobidments.

While worn, the surface of element 16 is parallel to the ear of a user. As is understood by one of ordinary skill in the art by studying FIG. 6, the strength of the spring defined by member 640 with its three curves depends on the relative position of element 16 and side support 700.

Headband member 630 typically grips the side of a user's head about the temple generally opposite member 640. Member 630 may be fully replaced with a member analogous to member 640 if a headband with two earphones is desired.

Side support 700 (shown in an exploded view in FIG. 6) comprises a temple pad generally much smaller than earphone element 16. Essentially it comprises first and second members 710 and 720, respectively. Both members may comprise commercial plastics, in which case member 710 may typically have a cushion member 730 glued thereto for contact with the head of a user of the headset.

The entire side support 700 is slidably mounted on member 630 for up and down movement thereon, but not pivoted movement. Channel 740 is defined by member 720 to capture rectangular plastic member 750 whenever first and second members 710 and 720 are joined together. Such joining may be accomplished with glue, sonic welding, or the like. Plastic tab 750 is mounted on the end of member 630, and closely fits channel 740 so as to provide a drop force on side support 700 to hold it in place.

Sliding of side support 700 on tab 750 adjusts the relative position of support 700 and element 16, thereby adjusting the triple-curve feature of headband element 640 to vary the above-described pre-load thereof. In one preferred embodiment, side support 700 is adjustable approximately three quarters of an inch.

While specific embodiments of the present invention are disclosed above, the foregoing discussion is intended to serve as words of description, and not as words of limitation with regard to the scope of the present invention. Any modifications or variations to the embodiments discussed above or equivalents thereof which would occur to one of ordinary skill in the art are intended to be included within the scope of the invention. For example, in FIG. 4 rack 300 and pinion 310 may be associated respectively with longitudinal members 42 and 46, or vice-versa. Furthermore, any particular combinations or groupings of the various features discussed above are also included within the scope of the invention. For example, a particular embodiment of the present invention might include earphone elements 16 and 20 (replacing support 12) in combination with boom element 22 and the fine adjustment means illustrated in FIG. 4. Alternatively, earphone elements 16 and 20 may be used with no boom for a microphone, but instead using the FIG. 5 embodiment of the fine adjustment means. The following claims, while providing further description and definition of the scope of the present invention, are also intended to cover all such variations, modifications, equivalents and combinations.

What is claimed is:

1. A headband for supporting at least one speaker element of the head of a user, comprising:

a C-clamp member having opposing ends defining an axial span therebetween with said at least one speaker element on one of said opposing ends thereof, and comprising two mutually-overlapping headband elements, the overlapping relationship of which is continuously adjustable along an axis of relative axial movement for selectively establishing a particular axial span between said opposing ends of said C-clamp member;

axial span adjustment means, located substantially near the center of said C-clamp member, for making and holding minor variations of said particular axial span thereof, thereby selectively controlling axial pressure on the head of a user, said axial span adjustment means including a single rack member and a corresponding pinion member, said single rack member being fixedly received on one of said two headband elements with the teeth of such rack member being axially spaced therealong, and said pinion member having a rotation axis and being freely-rotatably mounted on the other of said two headband elements with such rotation axis of such pinion being perpendicular to said axis of relative axial movement of said two headband elements, while also being in a plane parallel to the plane of such headband elements so as to provide access to said pinion for direct manipulation thereof by a user; and securement means, separate from said axial span adjustment means and supported on at least one of said two headband elements, for selectively fixing the relative overlapping relationship of said two headband elements as established by said axial span adjustment means.

2. A headband as in claim 1 wherein said securement means includes a set screw carried in one of said two headband elements for fixedly engaging with the other of said two headband elements.

3. A headband as in claim 1, wherein said particular span is adjusted with said C-clamp member so as to approximate the head breadth of a given user and said span adjustment means is functional to adjust said particular span towards the biauricular breadth of said given user.

4. An adjustable headset to be worn by a user, comprising:
- a headband having a side support mounted on one end thereof, and an earphone element mounted on the other end thereof, said side support and said earphone element defining an axial distance therebetween;
- first adjustment means for making coarse adjustment of the axial distance between said side support and said earphone element, said first adjustment means including flexible curved members, forming a portion of said headband, for selective coarse positioning by said user;
- second adjustment means for making fine adjustment of said axial distance between said side support and said earphone element, said second adjustment means including two longitudinal slidably-engaged members of said headband, and a control means for controlling their relative axial position, said control means including a geared mechanism for permitting said user to make relatively fine adjustments of said axial distance, and thereby reduce as desired the pressure applied to the head of said user by said first adjustment means; and
- at least one headband member having a plurality of curves which define a spring of a particular pre-load force, and wherein said side support is controllably mounted on said one end of said headband to thereby permit coarse positioning by controllably positioning said side support relative said earphone element to vary the particular pre-load force of said spring.

5. An adjustable headset as in claim 4, wherein said control means includes fixing means for relatively fixing said axial position as established by said control means.

* * * * *